United States Patent
Niebling et al.

[11] Patent Number: 5,944,321
[45] Date of Patent: Aug. 31, 1999

[54] SEAL, IN PARTICULAR A ROLLING BEARING SEAL

[75] Inventors: Peter Niebling, Bad Kissingen; Roland Langer, Schwanfeld; Rudi Eck, Gadheim; Rainer Breitenbach, Gochsheim, all of Germany

[73] Assignee: FAG Automobiltechnik AG, Germany

[21] Appl. No.: 08/835,298

[22] Filed: Apr. 7, 1997

[30] Foreign Application Priority Data

Apr. 13, 1996 [DE] Germany .................. 196 14 649

[51] Int. Cl.$^6$ ........................................... F16J 15/32
[52] U.S. Cl. ............................... 277/549; 277/566
[58] Field of Search ............... 277/549, 562, 277/565, 566

[56] References Cited

U.S. PATENT DOCUMENTS

| | | | |
|---|---|---|---|
| 4,185,838 | 1/1980 | Danner | 277/562 |
| 4,434,985 | 3/1984 | Sonnerat | 277/549 X |
| 4,527,673 | 7/1985 | Szcupak | 277/565 X |
| 5,042,822 | 8/1991 | Dreschmann et al. | 277/549 X |
| 5,458,420 | 10/1995 | Otto | 277/562 X |
| 5,553,870 | 9/1996 | Czekansky et al. | 277/565 X |
| 5,618,116 | 4/1997 | Isikawa | 277/562 X |

FOREIGN PATENT DOCUMENTS 0260441  10/1991  European Pat. Off. .

*Primary Examiner*—Anthony Knight
*Assistant Examiner*—Gary Grafel
*Attorney, Agent, or Firm*—Ostrolenk, Faber, Gerb & Soffen, LLP

[57] ABSTRACT

A seal for the axial sides of a rolling bearing and being disposed between the inner and outer rings of the bearing. The seal including an axially inward thrust washer and an axially outward sealing washer opposite the thrust washer. The thrust washer is generally C-shaped with a radially inwardly and axially outwardly sloping thrust surface. The sealing washer includes a radial sealing lip which is sloped radially inwardly to seal on the thrust surface of the thrust washer and may include an axial lip which seals against the radial leg of the thrust washer and may include a radially outwardly projecting sealing lip which contacts the outer ring and/or the portion of the thrust washer at the outer ring.

6 Claims, 4 Drawing Sheets ized signals, which are required, for example,
for an antilock braking system in the motor vehicle.

Other features and advantages of the present invention
will become apparent from the following description of the
invention which refers to the accompanying drawings.

SEAL, IN PARTICULAR A ROLLING BEARING SEAL

BACKGROUND OF THE INVENTION

The invention relates to a seal for a rolling bearing positioned in the space between the bearing rings and particularly to an improved seal with an outer or external sealing washer in sealing engagement with an inner or internal thrust washer.

German patent 38 38 824 discloses a seal comprised of two sealing washers, both L-shaped in partial cross section. Each washer has a vulcanized on sealing lip, which thrusts against the other sealing washer. Such seals have proven successful in practice. However, the vulcanized on sealing lips make them relatively expensive. There is an additional risk that when the outer sealing washer is pushed into the bearing, the radial sealing lip of the inner sealing washer will be inverted and damaged.

EP 0 065 887 A1 discloses a seal in which only one of the sealing washers has vulcanized on sealing lips which thrust against a thrust washer that is without sealing lips. Such seals are also known as cartridge seals. They have the disadvantage that, since they are preassembled, when they are pressed in between the races of a rolling bearing, they direct the pressing in forces via the rolling elements, which are consequently highly loaded and may be damaged thereby.

Finally, EP 0 260 441 A1 also discloses a seal, in which an inner thrust washer and an outer sealing washer with an axially bearing sealing lip are provided. However, the axial sealing lip does not produce as good a sealing effect as a radial sealing lip, i.e. a lip that applies a force radially.

SUMMARY OF THE INVENTION

It is an object of the invention to further develop a seal of the type mentioned at the beginning in such a way that, even with low cost production, a good sealing effect is obtained and the risk of the sealing lip or the rolling elements being damaged during assembly is avoided.

The seal of the invention is for sealing the axial sides of a rolling bearing and it is disposed between the inner and outer rings of the bearing. The seal includes an axially inward, inner thrust washer and an axially outward, outer sealing washer opposite the thrust washer. The thrust washer is generally C-shaped and has a radially inwardly sloping and axially outwardly projecting thrust surface. The sealing washer includes a radial sealing lip which is sloped radially inwardly to seal against the thrust surface of the thrust washer. The sealing washer may include an axially directed lip which applies axial force to seal against the radial portion of the thrust washer. It may also include a radially outwardly projecting sealing lip which contacts the bearing outer ring and/or the portion of the thrust washer at the outer ring.

Because the inner thrust washer has a thrust region which is designed with a slope against which the radial sealing lip of the outer sealing washer thrusts under prestress, in separate assembly steps for the washers, the pressing in force can be supported separately by each bearing race, whereby the force does not have to be directed via the rolling elements. The slope avoids inversion of the sealing lip and allows specific adjustability of the sealing lips against the thrust washer.

The radially extending region of the outer sealing washer may be provided with means for enabling rotational speed sensing. For example, it may have recesses, projections, shafts or magnetic particles which cause a magnetic field to change and thus make it possible for a sensor to generate speed dependent signals, which are required, for example, for an antilock braking system in the motor vehicle.

Other features and advantages of the present invention will become apparent from the following description of the invention which refers to the accompanying drawings.

DETAILED DESCRIPTION OF EMBODIMENTS OF THE INVENTION

Figure 1:
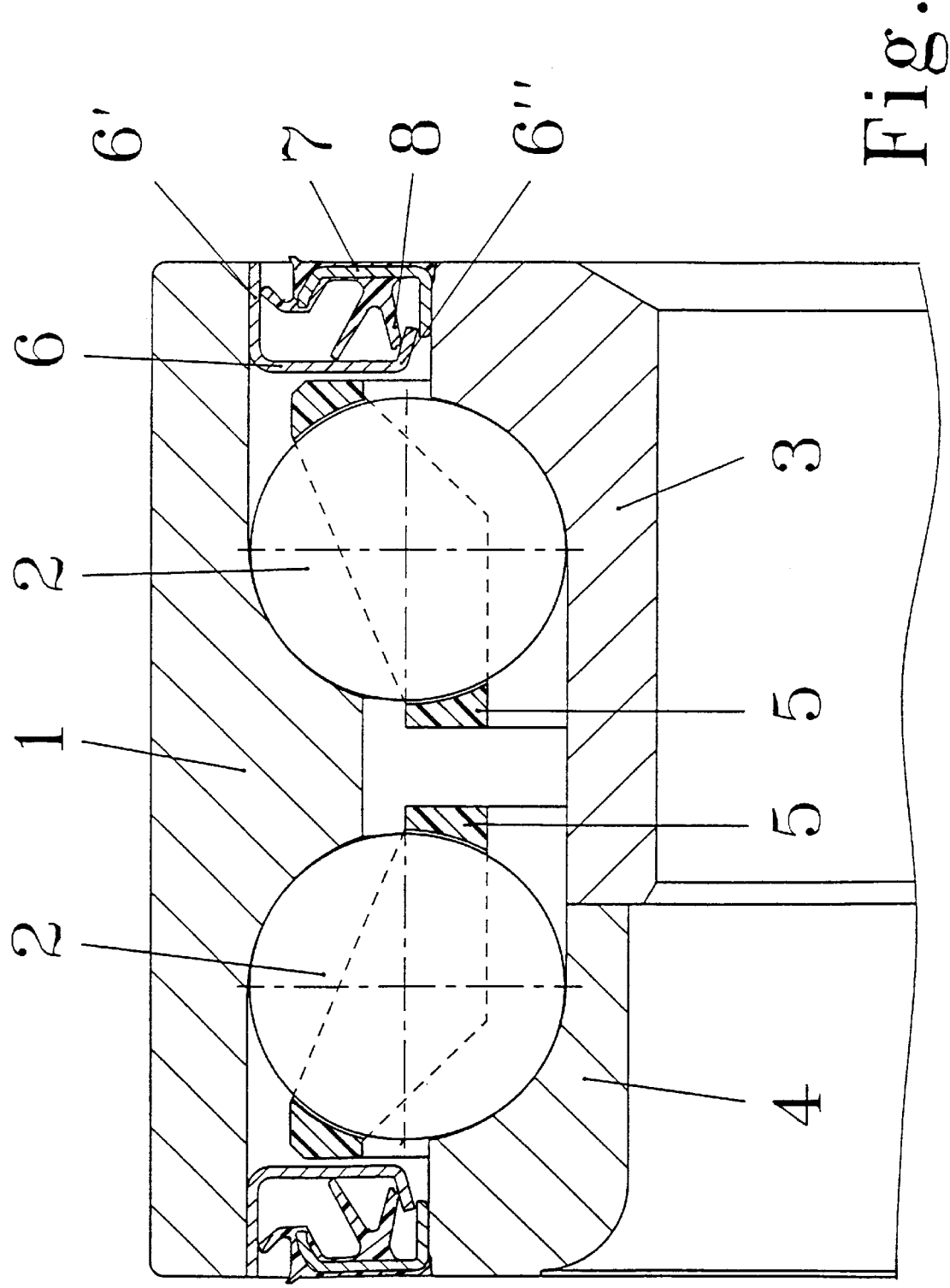
FIG. 1 shows a partial cross section through a rolling bearing which is provided with a seal according to the invention.

The bearing in FIG. 1 includes a rolling bearing outer race 1 of a one piece design. It has running tracks for two rows of balls 2, which are arranged between the outer race 1 and the respective inner races 3 and 4, which are together of a two part design. The balls 2 in the two rows are spaced apart in each row and the rows are also kept separate by a cage 5.

The rolling bearing is sealed at one or both axial sides by a seal which is arranged between the outer race and the inner race. As shown by the enlarged representation in FIG. 2, the seal comprises an axially inner thrust washer 6 and an axially outer sealing washer 7.

The inner thrust washer 6 is approximately C-shaped in partial cross section. It is pressed into the outer race 1. It has a cylindrical outer diameter leg 6', a radially extending web and an inclined radially inward thrust leg 6" that is designed with a radially inward and axially outward slope surface for sealing to the radial sealing lip 8 of the sealing washer 7. To avoid corrosion, the thrust washer 6 is made from stainless sheet steel.

The external sealing washer 7 comprises a sheet metal annular disk 7', which is approximately L-shaped in partial cross section. It has a cylindrical inner diameter leg 7" which is pressed on the inner ring 3. The radial sealing lip 8 is vulcanized on the disk 7'. That lip 8 is adapted to apply force radially inwardly and against the surface of the washer thrust leg 6".

Also vulcanized on the disk 7' are an axial sealing lip 9 for applying axially directed force and two further, radially outwardly projecting radial sealing lips 10 and 11, which each contact the thrust washer 6 and ensure a good sealing effect.

Figure 2:
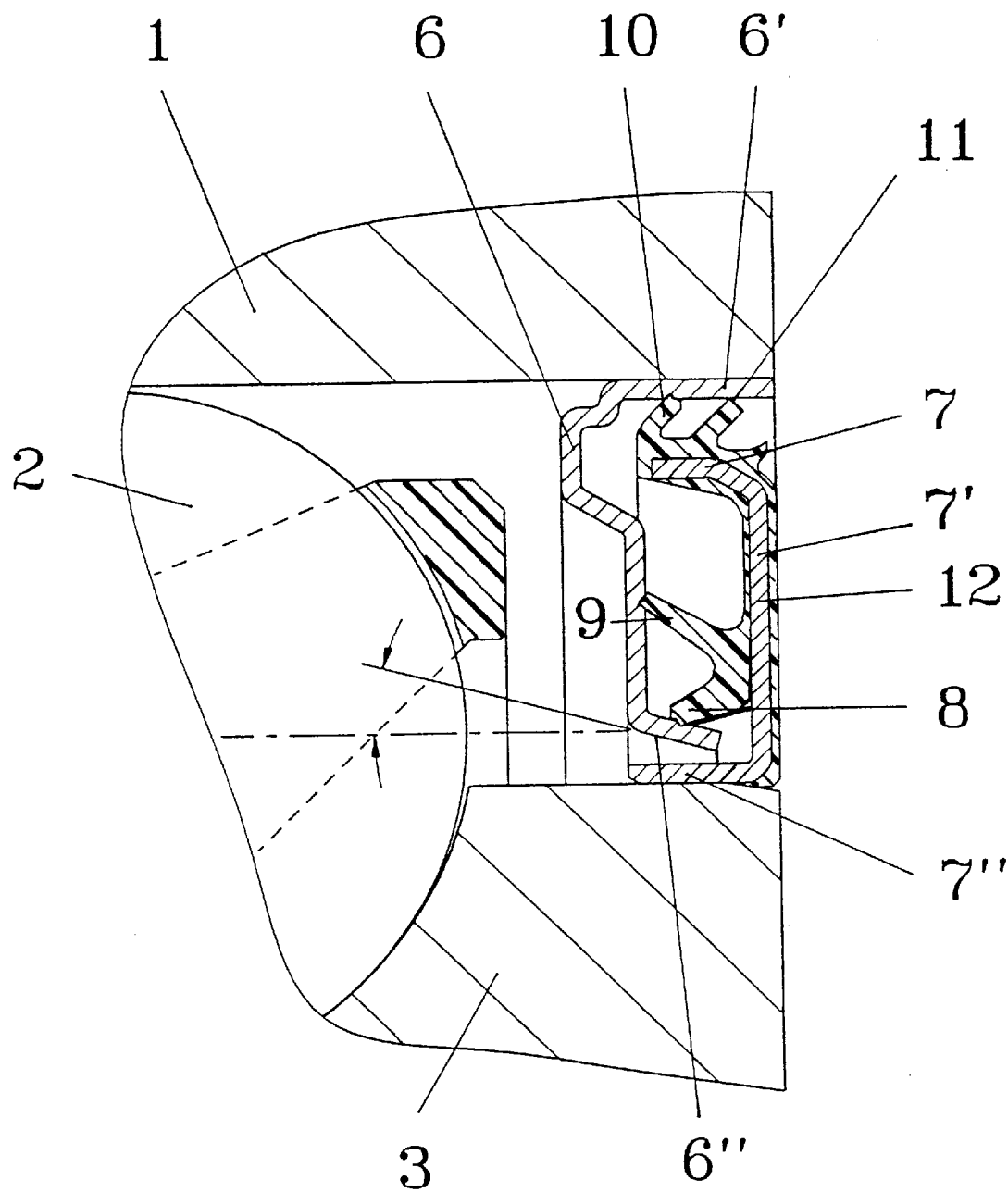
FIG. 2 shows the seal in an enlarged representation.

In the embodiment shown in FIG. 2, the radially extending region of the sealing washer 7 is provided with recesses 12, so that the washer may also serve as a pulse generating disk for enabling rotational speed sensing because its radial region thereby defines a rotational speed indicator by changing a magnetic field. The recesses 12 punched into the sheet metal disk are filled by the vulcanized sealing lip material.

Figure 3:
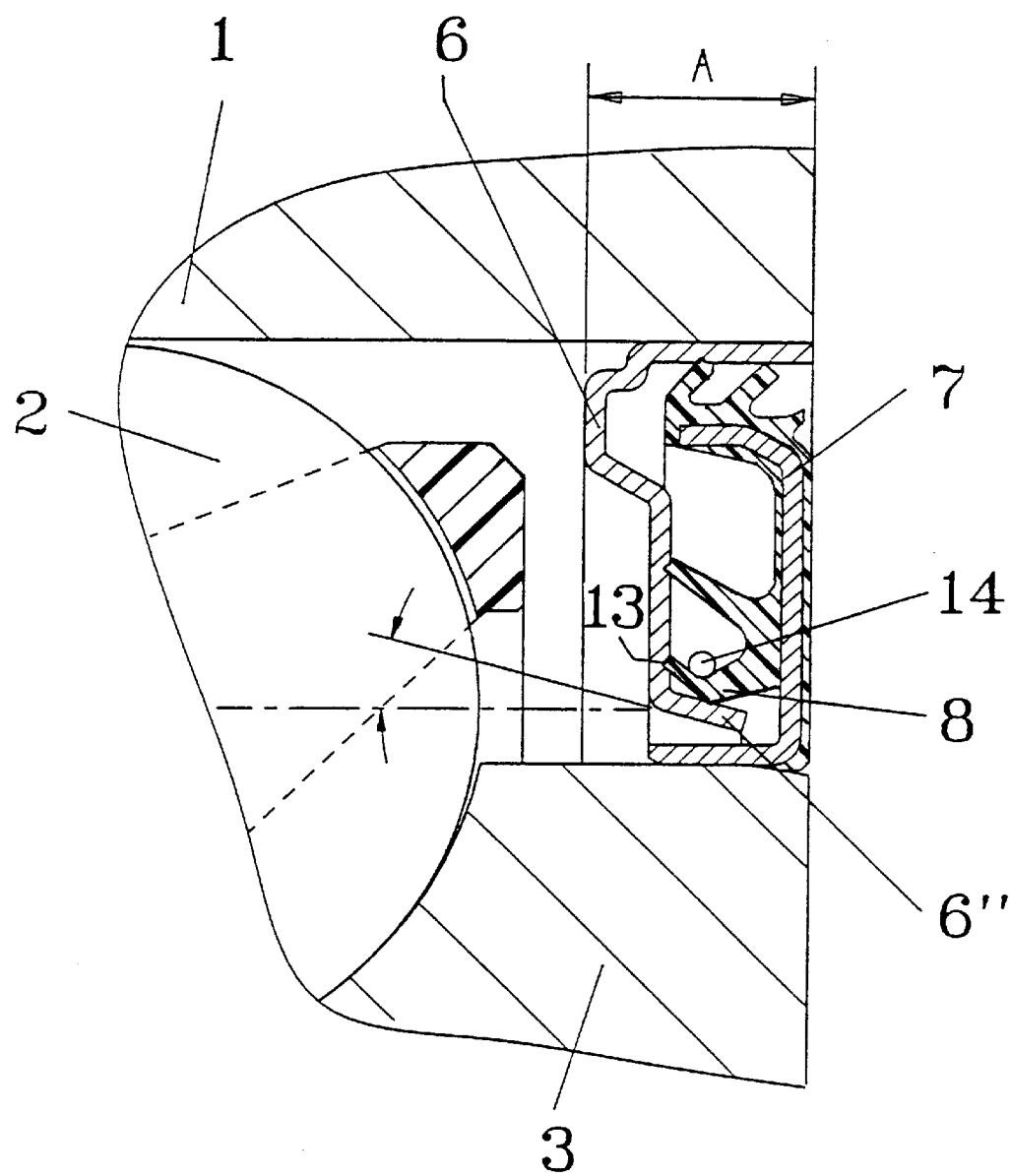
FIG. 3 shows a variant of a seal in which the radial sealing lip is combined with an axial sealing lip.

As represented in FIG. 3, the radial sealing lip 8 is combined with an axial sealing lip 13 that extends axially from the free end of the lip 8. Both sealing lips are prestressed by a spring ring 14 which presses them against the thrust washer 6. A further advantage here is that the force of the axial sealing lips, and consequently the frictional behavior of the seal, can be influenced by possibly changing the distance A between the washers 6, 7 when they are pressed into the bearing races 1 or 3.

Figure 4:
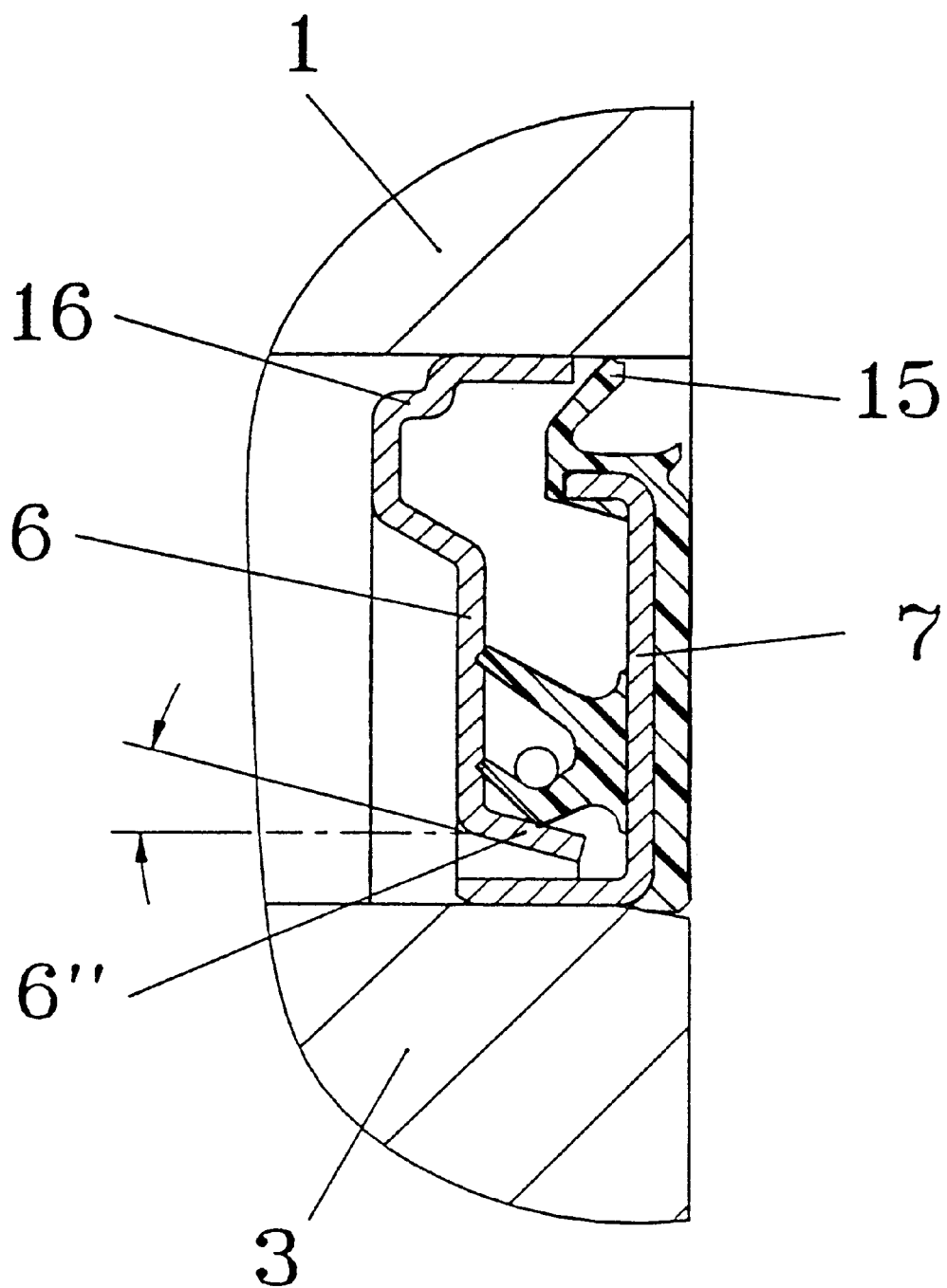
FIG. 4 shows a further variant of a seal.

The embodiment of the seal depicted in FIG. 4 is distinguished by the fact that, to protect the thrust washer 6 from the environment, the sealing washer 7 is provided with an additional radial sealing lip 15, which thrusts radially outward against the outer race 1 to form a preseal.

To facilitate handling, the thrust washer 6 is provided with a corner fixture 16 of a small diameter, which makes it possible to stack the thrust washers and thus to use an automatic assembly unit to process them.

In all the embodiments represented, the thrust region 6" for the radial sealing lip 8 is oriented at a radially inwardly directed slope for reliably avoiding inversion of the sealing lip 8 during assembly of the washers and avoiding damage to the sealing lip 8.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A seal for a rolling bearing for sealing the space between the rings of the bearing, wherein the bearing comprises an inner ring, an outer ring and rolling elements between the inner and outer rings and defining space between the inner and outer rings, the seal being disposed at least at one side of the bearing between the rings;

the seal comprising:
      a thrust washer axially opposite a sealing washer; the thrust washer having a leg attached on the outer bearing ring and having a radial portion projecting toward the inner bearing ring, the thrust washer including a thrust surface extending from the radial portion radially toward the inner bearing ring and having a slope that is inclined radially toward the inner bearing ring and axially toward the sealing washer;
      the sealing washer is attached on the inner bearing ring; the sealing washer including at least one radial sealing lip which thrusts radially against the thrust surface of the thrust washer under prestress;
      the seal is so placed with reference to the space between the bearing rings that the thrust washer is axially disposed toward the interior of the bearing and the sealing washer is axially disposed toward the exterior of the bearing.

2. The seal of claim 1, wherein the axial positions of the sealing washer of the seal are settable with reference to the thrust washer.

3. A seal for a rolling bearing for sealing the space between the rings of the bearing, wherein the bearing comprises an inner ring, an outer ring and rolling elements between the inner and outer rings and defining space between the inner and outer rings, the seal being disposed at least at one side of the bearing between the rings;

the seal comprising:
      a thrust washer axially opposite a sealing washer; the thrust washer having a leg attached on one of the bearing rings and having a radial portion projecting toward the other bearing ring, the thrust washer including a thrust surface extending from the radial portion radially toward the other bearing ring and having a slope that is inclined radially toward the other bearing ring and axially toward the sealing washer;
      the sealing washer is attached on the other bearing ring from the thrust washer; the sealing washer including at least one radial sealing lip which thrusts radially against the thrust surface of the thrust washer under prestress;
      the seal is so placed with reference to the space between the bearing rings that the thrust washer is axially disposed toward the interior of the bearing and the sealing washer is axially disposed toward the exterior of the bearing.

4. The seal of claim 3, wherein the axial positions of the sealing washer or the seal are settable.

5. A seal for a rolling bearing for sealing the space between the rings of the bearing, wherein the bearing comprises an inner ring, an outer ring and rolling elements between the inner and outer rings and defining space between the inner and outer rings, the seal being disposed at least at one side of the bearing between the rings;

the seal comprising:
      a thrust washer axially opposite a sealing washer;
      the thrust washer having a leg attached on one of the bearing rings and having a radial portion projecting toward the other bearing ring, the thrust washer including a thrust surface extending from the radial portion radially toward the other bearing ring and having a slope that is inclined radially toward the other bearing ring and axially toward the sealing washer;
      the sealing washer is attached on the other bearing ring from the thrust washer; the sealing washer including at least one radial sealing lip which thrusts radially against the thrust surface of the thrust washer under prestress;
      the thrust washer has a side that faces away from the sealing washer and the side defines a small outer diameter region for enabling stacking of the thrust washers.

6. The seal of claim 1, wherein the sealing washer includes means on the radial sealing lip for enabling the rotation speed of the thrust washer to be sensed as the thrust washer rotates past the sealing washer.

\* \* \* \* \*